United States Patent [19]
Katahira

[11] 3,992,305
[45] Nov. 16, 1976

[54] SHUTTLE SPEED CONTROL DEVICE
[75] Inventor: Yukio Katahira, Tokorozawa, Japan
[73] Assignee: Nihon Beru-Haueru Kabushiki Kaisha (Bell and Howell Japan, Ltd.), Higashimurayama, Japan
[22] Filed: Oct. 28, 1975
[21] Appl. No.: 625,964

[30] Foreign Application Priority Data
Nov. 22, 1974 Japan............................. 49-134917

[52] U.S. Cl................................... 352/14; 226/44
[51] Int. Cl.².......................................... G03B 31/00
[58] Field of Search ............. 352/14; 242/186, 187, 242/188, 189; 226/44, 45

[56] References Cited
UNITED STATES PATENTS
3,597,056    8/1971    Sasaki................................... 352/14

Primary Examiner—Monroe H. Hayes
Attorney, Agent, or Firm—John E. Peele, Jr.; Gerald B. Epstein; Roger M. Fitz-Gerald

[57] ABSTRACT

Disclosed for a sound motion picture camera is an improved shuttle speed control device including a film loop sensor sensitive to slight variations in the film loop for causing the speed of the shuttle to be changed by a simple brake device utilizing powers of the drive motor whereby less force is required for sensing the size of the film loop to maintain picture-sound synchronization.

3 Claims, 3 Drawing Figures

SHUTTLE SPEED CONTROL DEVICE

This invention relates to a shuttle speed control device for either a motion picture camera or a motion picture projector for handling motion picture film on which sound is to be recorded simultaneously as the image is photographed, and from which sound is to be reproduced simultaneously.

In a simultaneous recording sound motion picture camera, film is transported intermittently past an exposure station, and is transported continuously past a sound station. The sound for a particular film frame image is displaced along the film by a short distance, e.g., 18 frames. Thus, for "lip synchronized" recording and playback, the sound to frame spacing must be maintained constant.

In many sound motion picture cameras, two motors are used respectively to drive a shuttle to intermittently move film past an aperture at the exposure station, and to drive a capstan to continuously move film at a constant rate past a transducer at the sound station. Although the motors may be manufactured uniformly, differences occur in the rate at which film is transported through the stations. Such differences accumulate during transporting a length of film resulting in slight changes in the film length between the stations. The between station film length increases or decreases so that spacing becomes either 19 or 20 frames, or 17 frames causing loss of picture-sound-synchronization after a few inches of film is transported. If the error is permitted to accumulate over a length of film, the lack of picture-sound-synchronization, would be obviously noticeable and film damage could occur.

Other sound motion picture cameras use only one motor to drive both the shuttle and the capstan. Nevertheless, the film is sometimes transported through the exposure and sound stations at different rates because of small errors in the transmission mechanisms. That is, as the film is pulled out of the film supply cartridge, the film is sometimes transported through the exposure station slower than the rate it is moved through the sound station. Alternatively, the film is sometimes moved faster by the shuttle at the exposure station than by the capstan at the sound station.

Between the exposure station and the sound station, the film path is provided with a loop which becomes larger or smaller depending on the relative speeds of the shuttle and the capstan. When the loop becomes smaller, the film may be stretched and may be caused to slip in the sound station as the friction of the capstan against the film is weaker than the more positive force applied by the shuttle. Hence, the sound would be caused to be distorted when slippage occurs whereby the film is not uniformly pressed against the transducer at the sound station. Further, when the loop becomes larger, the film can be stopped in the camera due to jamming or the like. In either case, the changes in film length between the stations can cause aberrations in the sound as well as loss of synchronization between the sound and the picture.

To overcome the problems set forth above and to maintain the picture and sound in "lip synchronization," an improved shuttle speed control device is provided. A film loop sensor located between the capstan and the shuttle in a motion picture camera is well known. When such sensors are of the electric type and respond sensitively to changes in the size of the film loop, the shuttle can become unstable in the rates at which it is transporting film. Generally, an individual motor is required to drive the shuttle and another motor is required to drive the capstan as the shuttle speed is continuously varied while the capstan is driven at a constant speed.

Another well known device often used in varying output speed is a tapered pulley which is installed on the motor shaft for output to the shuttle. Movably positioned on the pulley is a belt which moved respectively further in or further out on the pulley to change the speed of the shuttle in response to the movement. However, a large force is required to move the belt on the pulley which force cannot be readily obtained by having the sensor engage the film directly and to directly move the belt, thereby reducing sensitivity of the sensor.

This invention is an improved shuttle speed control device which removes the above mentioned shortcomings. The sensor is arranged to be sensitive to the slight variations of the film loop causing the speed of the shuttle to be changed accurately and sensitively. This action is accomplished with a simple mechanism whereby the sensor actuates a brake and causes the position of the belt to be changed by utilizing the force of the motor. Hence, the sensor is actuated to respond with significant sensitivity to changes in the size of the film loop.

An object of the present invention is to provide an improved shuttle speed control device for a sound motion picture instrument in which sound-picture synchronization is maintained by a power drive which enhances sensitivity of the film loop sensor.

Other objects and advantages of the invention will become apparent from the detailed description which follows when taken in conjunction with the accompanying drawings in which like numerals refer to like parts.

IN THE DRAWINGS

Figure 1:
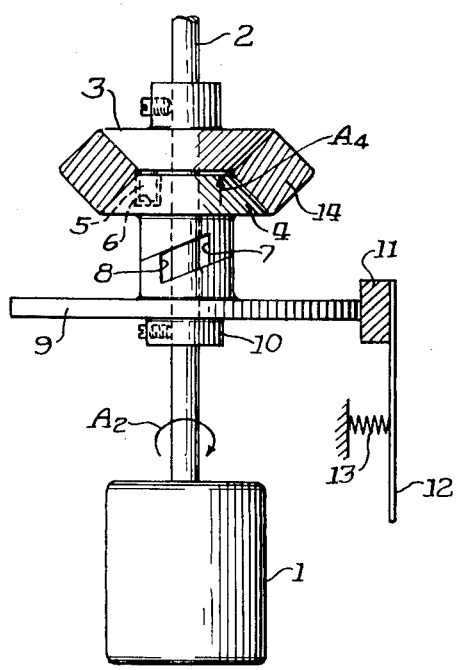
FIG. 1 is a schematic representation of the speed changing device with the brake actuated.
Figure 2:
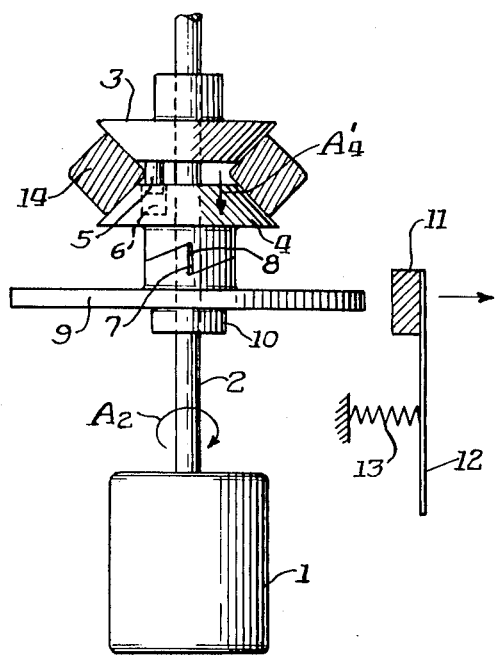
FIG. 2 is a similar schematic representation of the speed changing device with the brake released.

Referring now to the FIGS. 1 and 2, a speed changing device is shown connected to a motor 1 having a shaft 2 driven thereby. The device includes a half pulley 3 which is tapered on one side and is fixed to the shaft 2 for rotation therewith. A half pulley 4 is arranged on the shaft 2 opposite the half pulley 3. The half pulley 4 is slidable axially of the shaft 2 relative to the fixed half pulley 3. The half pulley -cone portion 3 and the half pulley -cone portion 4 are rotated together by a pin 5 which extends from half pulley 3 into a hole 6 in half pulley 4.

In addition to the pin receiving hole 6 formed in one face of half pulley 4, the other face of that half pulley is provided with a slanted pawl 7. Cooperating with the claw 7 is another slanted pawl 8 on a brake disk 9 rotatable on shaft 2 but fixed against axial movement on the shaft by a fixed ring member 10. The slanted pawls 7 and 8 have facing inclined cam surfaces which rise to a height equal to the maximum spacing between the half pulleys.

Adjacent the peripheral surface of the brake disc 9 is arranged a brake member 11, which is carried by an end of a film loop sensor 12. A spring 13 continuously biases the brake member of the loop sensor 12 toward engagement with the brake disc 9 to control rotation of the brake disk and therefore the rate of rotation of a transmission member shown as belt 14 which passes between the half pulleys 3 and 4.

When the shaft 2 of the motor 1 is rotated in the direction A2, shown in FIG. 1 as being clockwise, half pulley 3 is rotated in the same direction. By the pin 5 and hole connection of half pulley 3 with half pulley 4, the latter pulley is rotated at the same rate as the pulley fixed to shaft 2. Similarly, brake disc 9 is rotated at the same rate since it is driven by the pawl 8 through the connection to the motor shaft 2 by the half pulley portions. However, when the brake disc 9 is engaged by brake 11, the disc is slowed slightly and the slanted face of the pawl 8 causes the half pulley 4 to be raised toward the half pulley 3 in the direction of arrow A4. Therefore, the belt 14 rides at maximum height on the pulley periphery formed by the half pulley portions 3 and 4.

The speed of belt 14 becomes slower than as shown in FIG. 1 when the brake 11 is removed from the brake disc 9 as shown in FIG. 2. That is, when the brake disc 9 is free of the restraint by brake 11, the brake disc rotates faster. As the disc rotates, pawl 8 of the disc meshes with the pawl 7 of the half pulley 4 and therefore permits the half pulley 4 to move in the direction of arrow A4¹. As the space between the half pulley 3 and half pulley 4 with the pawl becomes wider, the belt 14 sinks between the half pulley members thereby slowing the rate of rotation of the belt.

Figure 3:
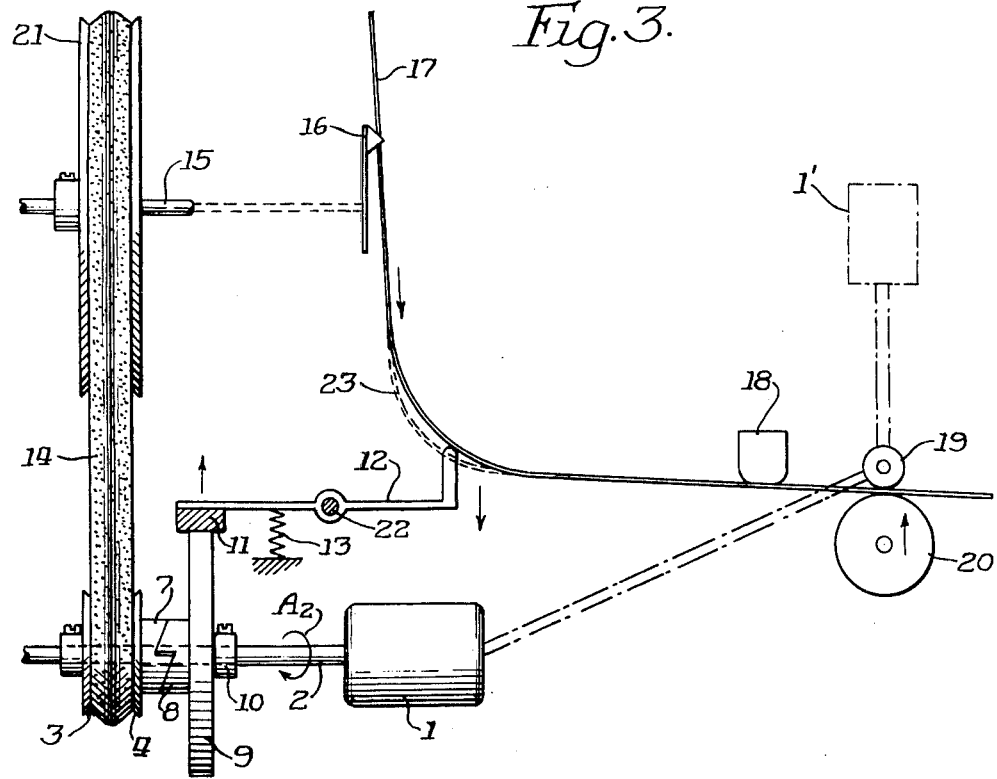
FIG. 3 is an elevational view of a camera with the speed changing device, according to this invention, arranged in operative orientation.

In FIG. 3, the shuttle control device is shown arranged to cooperate with pertinent components of a sound motion picture camera of the type in which sound is recorded directly on a film. In this preferred embodiment, the rate of film transport is 18 frames per second. In the camera, a driving shaft or transmission 15 is driven by the belt 14 to drive a shuttle 16 for intermittently transporting a film 17 through the exposure station. The sound station of the camera includes a recording head or transducer 18 across which film is transported by a capstan 19 and a pinch or pressure roller 20. The capstan is powered either by the motor 1 or a second separate motor 1'. Together, the capstan and the pinch roller constantly transport the film through the sound station at exactly 18 frames per second.

The output shaft 2 of the motor 1 is coupled to the capstan 19 and by the shuttle speed control device to a pulley 21 from which the shuttle 16 is connected. The shuttle speed control device is actuated responsive to the sensor 12, pivoted about an axis 22 with one end engaging a loop 23, formed in the film 17 between the exposure and sound station. The other end of the sensor carries the brake pad 11. If the film is transported at the same rate by both the shuttle 16 and the capstan 19, the loop size is constant and the image and sound are synchronized. However, when the speeds at which film 17 is transported by the shuttle and the capstan differ, although slightly, the loop is enlarged or reduced in response thereto. The differential in loop size, occurs due to the slip in the transporting mechanism, the frictional resistance of film, and errors accumulating in the film transporting between two transporting portions. When the loop size increases, the sensor is pivoted about axis 22 to remove the brake 11 from the braking disk 9 as shown in FIG. 2. Thereby, the belt 14 is permitted to move to a smaller diameter on half pulley 3 and half pulley 4 as the pulley portions separate. Thus, the rate of operation of the shuttle 16 is slowed causing the capstan to transport film faster, wherein the excess film length generating the film loop 23 is reduced.

Alternatively, when the shuttle 16 transports film too slowly the film loop is reduced from a preferred size. Since the sensor 12 is biased against the film by spring 13, the brake 11 is moved into engagement with the brake disk 9. As above described, the restraint on the brake disc causes the belt 14 to be run on the outer periphery or larger diameter of the half pulley portions 3 and 4 so as to drive the shuttle 16 at a faster rate. The increase in shuttle rate continues until film is accumulated in the film loop thereby releasing the brake from the brake disc.

During camera operation, the length of film between the shuttle 16 and the transducer 18 is maintained constant, at for example 18 frames by repeating rapidly the abovementioned two actions of increasing and decreasing the film loop size as required.

In summary, a highly sensitive shuttle speed control device is described whereby the shuttle speed is adjusted periodically and smoothly. The smoothness of this action is enhanced by the separation of the force to drive the shuttle and the force to detect the film loop size.

What I claim is:

1. A shuttle speed control device for a sound motion picture camera including a drive motor having an output shaft driving a shuttle for transporting film intermittently through an exposure station and a capstan for transporting film constantly through a sound station, and a film loop sensor arranged between the exposure station and the sound station, the control device comprising:
    a first half pulley fixed to said motor output shaft;
    a second half pulley coupled to said first half pulley and adjustable along said motor output shaft;
    transmission means arranged about said half pulleys and coupled to said shuttle for powering said shuttle;
    a brake disk rotatably supported on said output shaft;
    a first pawl member arranged on said second half pulley;
    a second pawl member arranged on said brake disk for engagement with said first pawl member;
    a brake member on said film loop sensor movable responsive to variations in the size of the film loop whereby an increase in film loop size causes said brake member to engage said brake disc to increase the rate of operation of said shuttle relative to the rate of rotation of said capstan, and decrease of said film loop size causes said brake member to release said brake disk to decrease the rate of operation of said shuttle relative to the rate of rotation of said capstan.

2. A shuttle speed control device as recited in claim 1 wherein said pawls cause axial movement of one of said half pulleys when said brake member is engaged and removed from said brake disc responsive to actuation of said loop sensor.

3. A shuttle speed control device as recited in claim 2 wherein said half pulleys cause said shuttle to be driven at different rates responsive to the axial displacement of said pulleys.

* * * * *